(12) United States Patent
Li et al.

(10) Patent No.: US 6,255,896 B1
(45) Date of Patent: Jul. 3, 2001

(54) METHOD AND APPARATUS FOR RAPID INITIALIZATION OF CHARGE PUMP CIRCUITS

(75) Inventors: Bo Li, Sacramento; Marc E. Landgraf, Folsom; Mase Taub, Elk Grove; Sandeep K. Guliani, Folsom, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/406,329

(22) Filed: Sep. 27, 1999

(51) Int. Cl.[7] ........................................ G05F 3/02
(52) U.S. Cl. ............................ 327/536; 327/537
(58) Field of Search ............................ 327/534, 536, 327/537; 307/110

(56) References Cited

U.S. PATENT DOCUMENTS

| | | | |
|---|---|---|---|
| 5,059,815 | * 10/1991 | Bill et al. ............................. | 327/536 |
| 5,367,489 | * 11/1994 | Park et al. ........................... | 327/536 |
| 5,394,320 | 2/1995 | Blodgett . | |
| 5,412,257 | * 5/1995 | Cordoba et al. ..................... | 327/536 |
| 5,610,549 | * 3/1997 | Choi ...................................... | 327/536 |
| 5,677,645 | * 10/1997 | Merritt ................................. | 327/536 |
| 5,939,935 | * 8/1999 | Merritt ................................. | 327/536 |

FOREIGN PATENT DOCUMENTS

WO 9411943    5/1994   (WO) .

* cited by examiner

Primary Examiner—Terry D. Cunningham
(74) Attorney, Agent, or Firm—Blakely, Sokoloff, Taylor & Zafman LLP (57) ABSTRACT

The present invention provides a method, apparatus, and system for rapid transition of a charge pump circuit from a low power state to a high power state. The charge pump circuit has at least one pump stage. The at least one pump stage includes at least a first capacitor coupled to a gate of a first switching transistor forming a boot node and at least a second capacitor coupled to an output node of the at least one pump stage. It is determined whether the charge pump circuit is in the low power state or the high power state. If the charge pump circuit is in the low power state, a first predetermined voltage and a second predetermined voltage that are different than the ground voltage level are applied to the boot node and the output node, respectively. If the charge pump circuit is in the high power state, the first predetermined voltage and the second predetermined voltage are removed from the boot node and the output node, respectively.

29 Claims, 6 Drawing Sheets

METHOD AND APPARATUS FOR RAPID INITIALIZATION OF CHARGE PUMP CIRCUITS

FIELD OF THE INVENTION

The present invention relates to voltage control in integrated circuits and devices. More specifically, the present invention relates to an apparatus, method, and system for reducing the time that it takes for a charge pump circuit to transition from a low power state to a higher power state.

BACKGROUND OF THE INVENTION

Integrated circuits and systems have continued to advance and become more complex at a rapid rate. As a result, effective and efficient power and thermal management of the integrated circuits and systems have become more and more critical in circuit design and implementation. In order to reduce the power consumption in integrated circuits and systems, these circuits and systems have been designed to operate at lower voltage levels. For example, integrated circuits and systems have been designed to operate at voltage levels such as 5 volts, 3.3 volts, or less. However, some components or circuitry in these integrated circuits or systems require higher voltages to operate or function. For instance, flash electrically erasable programmable read only (flash EEPROM) memory devices that are used in computers or systems typically require voltage levels that are higher than that provided by the power supply to perform various operations such as read, erase, or programming operations. In order to generate the voltage levels required by the flash memory that is higher than that provided by the power supply, charge pump circuits are typically used to generate a higher voltage level from a lower voltage level source. Charge pump circuits typically contain multiple pump stages that are used to increase a lower voltage input to a higher voltage output through incremental voltage increase at each stage. Each of the multiple pump stages in the charge pump circuits typically uses one or more capacitors for storing and transferring charge to the next pump stage in order to increase the voltage level from one stage to the next stage. In a typical charge pump circuit that includes multiple pump stages, each of the pump stages is to reach a sufficient voltage level (i.e., its own equilibrium voltage level) before the charge pump circuit can generate a steady current at the required output voltage. For example, assuming that there are three pump stages in a charge pump circuit that is designed to produce a required output voltage of Vout, each of the pump stages has to be pre-charged or warmed up to its equilibrium voltage level (V1 for the first stage, V2 for the circuit stage, and V3 for the third stage) before the charge pump circuit can generate a steady current at the required Vout voltage. Conventionally, the voltage levels of the various pump stages in a typical charge pump circuit are reduced to ground when the charge pump circuit is placed in a low power state (e.g., shut down, powered off, standby, etc.). More specifically, the various capacitors that are used for storing charge are discharged as the charge pump circuit is put in the low power state (e.g., shut down, etc.). When the charge pump circuit transitions to a higher power state (e.g., active), all capacitors need to be pre-charged up to their equilibrium levels before the charge pump circuit can produce a steady current at the required output voltage level. It takes time and energy for the charge pump circuit to transition from a low power state (e.g., shut down) to a higher power state (e.g., running) as the capacitors cannot be pre-charged instantaneously from the ground level up to their equilibrium levels. The repeat of transitioning the charge pump circuit from one power state (e.g., shut down) to another power state (e.g., running) causes the charge pump circuit to waste an unacceptable amount of time and energy (i.e., charge) as the charge pump circuit needs to be warmed up from a low Vcc level.

Accordingly, there exists a need to reduce the amount of time and energy for charge pump circuits to reach their equilibrium levels when they are transitioned from a low power state to a higher power state.

SUMMARY OF THE INVENTION

The present invention provides a method, apparatus, and system for rapid transition of a charge pump circuit from a low power state to a high power state. The charge pump circuit has at least one pump stage. The at least one pump stage includes at least a first capacitor coupled to a gate of a first switching transistor forming a boot node and at least a second capacitor coupled to an output node of the at least one pump stage. It is determined whether the charge pump circuit is in the low power state or the high power state. If the charge pump circuit is in the low power state, a first predetermined voltage and a second predetermined voltage that are different than the ground voltage level are applied to the boot node and the output node, respectively. If the charge pump circuit is in the high power state, the first predetermined voltage and the second predetermined voltage are removed from the boot node and the output node, respectively.

BRIEF DESCRIPTION OF THE DRAWINGS

The features and advantages of the present invention will be more fully understood by reference to the accompanying drawings, in which.

DETAILED DESCRIPTION

In the following detailed description numerous specific details are set forth in order to provide a thorough understanding of the present invention. However, it will be obvious to one skilled in the art that the present invention may be understood and practiced without these specific details.

In the discussion below, the teachings of the present invention are utilized to implement a method and apparatus for reducing the time and energy required to transition a charge pump circuit from a low power state (e.g., power off, etc.) into a higher power state (e.g., power on, etc.). In one embodiment, the charge pump circuit receives an input voltage at an input node and generates an output voltage at an output node that is higher than the input voltage. The charge pump circuit includes a plurality of pump stages and each stage in the charge pump circuit is required to reach its own equilibrium voltage level before the charge pump circuit can generate a steady current at the required output voltage level at the output node. When the charge pump circuit is placed in a low power state, an initialization voltage level that is substantially close to the corresponding equilibrium voltage level of each pump stage is applied to each respective pump stage by connecting each pump stage to a corresponding initialization voltage source. When the charge pump circuit is placed in a higher power state, the corresponding initialization voltage source is disconnected from each pump stage to allow normal operations of the charge pump circuit.

The teachings of the present invention are applicable to any charge pump circuit used to produce a higher voltage level than that of the power supply. However, the present invention is not limited to charge pump circuits and can be applied to other integrated circuits and systems in which the circuits or systems need to be pre-charged from one voltage level in one power state to another voltage level in another power state.

Figure 1:
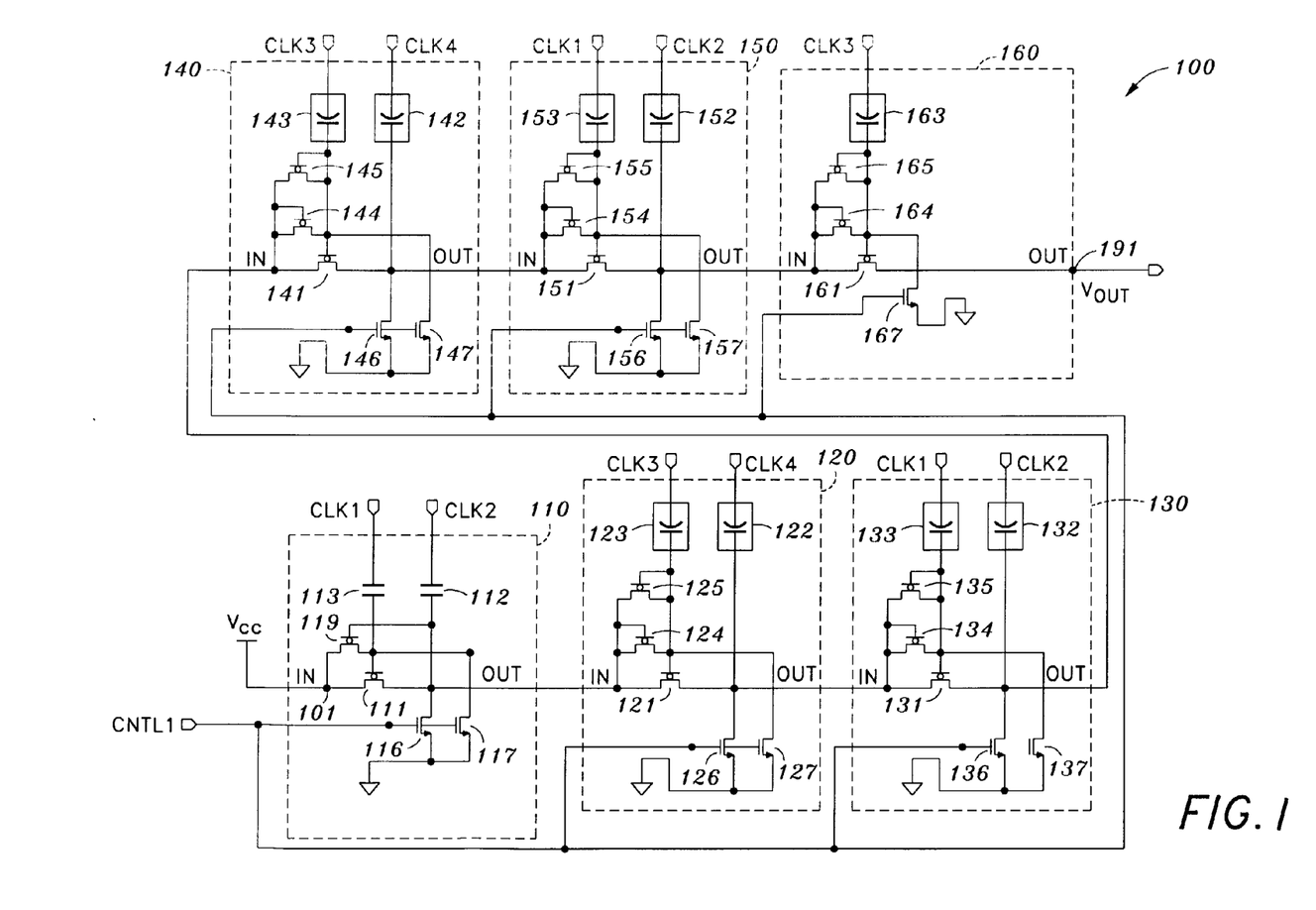
FIG. 1 shows a circuit diagram of one embodiment of a charge pump circuit including multiple pump stages whose corresponding voltage levels are reduced to ground when the charge pump circuit is placed in a low power state.

FIG. 1 shows a circuit diagram of one embodiment of a charge pump circuit 100 in which the voltage level at each pump stage is reduced to ground level when the charge pump circuit 100 is placed in a low power state (e.g., shut down, power off, standby, etc.). In one embodiment, the charge pump circuit 100 as shown in FIG. 1 includes five pump stages 110, 120, 130, 140, 150, and an output stage 160 that are connected in series in order to increase a low voltage level received at an input node 101 to a higher voltage level at an output node 191. Each pump stage in the charge pump circuit 100 includes an input node (CHGIN) and an output node (CHGOUT). The output node of each pump stage is coupled to the input node of a next pump stage. In one embodiment, the input node of the first pump stage 110 is coupled to receive an input voltage from a power supply source (not shown). In one embodiment, the output node of the final stage 160 is coupled to provide the output voltage to a device or circuit that requires a higher voltage level than that provided by the power supply to operate or function (e.g., a flash memory device). In this embodiment, the charge pump circuit 100 includes switching transistors 111, 121, 131, 141, 151, and 161 that are connected in series between the input node 101 and the output node 191. In one embodiment, the switching transistors are S type field effect transistors even though N type field effect transistors can also be used. Each of the switching transistors 111, 121, 131, 141, 151, and 161 includes a source terminal, a drain terminal, and a gate terminal. The source terminal of each switching transistor is connected to the drain terminal of the next switching transistor. The drain terminal of the first switching transistor 111 is connected to the input node 101 and the source terminal of the last switching transistor 161 is connected to the output node 191.

The charge pump circuit 100 as shown in FIG. 1 further includes storage capacitors 112, 122, 132, 142, and 152. Each of the storage capacitors is coupled between a corresponding clock signal and the source terminal of the respective switching transistor in the charge pump circuit 100. More specifically, the storage capacitor 112 is connected between a clock signal CLK2 and the source terminal of the switching transistor 111. The storage capacitor 122 is connected between a clock signal CLK4 and the source terminal of the switching transistor 121. The storage capacitor 132 is connected between the clock signal CLK2 and the source terminal of the switching transistor 131. The storage capacitor 142 is connected between the clock signal CLK4 and the source terminal of the switching transistor 141. The storage capacitor 152 is connected between the clock signal CLK2 and the source terminal of the switching transistor 151.

The charge pump circuit 100 as shown in FIG. 1 also includes boot node capacitors 113, 123, 133, 143, 153, and 163. Each of the boot node capacitors is coupled between a corresponding clock signal and the gate terminal of the respective switching transistor in the charge pump circuit 100. More specifically, the boot node capacitor 113 is connected between a clock signal CLK1 and the gate terminal of the switching transistor 111. The boot node capacitor 123 is connected between a clock signal CLK3 and the gate terminal of the switching transistor 121. The boot node capacitor 133 is connected between the clock signal CLK1 and the gate terminal of the switching transistor 131. The boot node capacitor 143 is connected between the clock signal CLK3 and the gate terminal of the switching transistor 141. The boot node capacitor 153 is connected between the clock signal CLK1 and the gate terminal of the switching transistor 151. The boot node capacitor 163 is connected between the clock signal CLK3 and the gate of the switching transistor 161.

The charge pump circuit 100 further includes a control transistor 119 in the first pump stage 110. The drain and source terminals of the control transistor 119 are coupled to the drain and gate terminals, respectively, of the switching transistor 111. In this embodiment, the control transistor 119 is an S type field effect transistor even though N type field effect transistor can also be used. The charge pump circuit 100 also includes pull-up transistors 124, 134, 144, 154, and 164 that are preferably S type field effect transistors although N type field effect transistors can also be used. The source terminals of pull-up transistors 124, 134, 144, 154, and 164 are coupled to the gate terminals of the switching transistors 121, 131, 141, 151, and 161, respectively. The pull-up transistors 124, 134, 144, 154, and 164 are diode connected in which their respective drain and gate terminals are connected to the drain terminals of the switching transistors 121, 131, 141, 151, and 161, respectively.

Also included in the charge pump circuit 100 are the pull-down transistors 125, 135, 145, 155, and 165 that are also diode connected. In this embodiment, the pull-down transistors are S type field effect transistors even though N type field effect transistors can also be used. The drain and gate terminals of the pull-down transistors 125, 135, 145, 155, and 165 are connected to the gate terminals of the switching transistors 121, 131, 141, 151, and 161, respectively. The source terminals of the pull-down transistors 125, 135, 145, 155, and 165 are connected to the drain terminals of the switching transistors 121, 131, 141, 151, and 161, respectively.

The charge pump circuit as shown in FIG. 1 includes switching devices 116, 126, 136, 146, and 156 that are used to discharge the storage capacitors 112, 122, 132, 142, and 152, respectively and thus reduce the voltage level at the respective internal nodes in the pump stages to ground level when the charge pump circuit is placed in a low power state (e.g., power down, standby, etc.). In one embodiment, these switching devices are N type field effect transistors even though S type field effect transistors can also be used. The drain terminals of devices 116, 126, 136, 146, and 156 are coupled to the source terminals of the switching transistors 111, 121, 131, 141, and 151, respectively (which are also coupled to the respective output nodes of the corresponding pump stages). The source terminals of the transistors 116, 126, 136, 146, and 156 are coupled to ground level. The gate terminals of the transistors 116, 126, 136, 146, and 156 are coupled to a control signal CNTL1. In one embodiment, the control signal CNTL1 is set to a first level (e.g., high) when the charge pump circuit is placed in a first power state (e.g., power down, standby, etc.) and set to a second level (e.g., low) when the charge pump circuit is placed in a second power state (e.g., power on, running, active, etc.). In one embodiment, when the charge pump circuit is placed in the first power state, the control signal CNTL1 is set to a high level (e.g., 4.5 volts) which causes the devices 116, 126, 136, 146, and 156 to turn on. As the devices 116, 126, 136, 146, and 156 are turned on, the corresponding storage capacitors 112, 122, 132, 142, and 152 are discharged through these devices thus reducing the corresponding voltage levels at the respective output nodes to ground level. When the charge pump circuit is placed in a high power state (e.g., active, running, etc.), the control signal CNTL1 is set to a low level (e.g., ground) which causes the devices 116, 126, 136, 146, and 156 to turn off thus disconnecting the corresponding storage capacitors and output nodes from the ground level to allow normal operations of the charge pump circuit. As a result, when the charge pump circuit 100 transitions from a low power state to a high power state, the storage capacitors need to be pre-charged from ground level up to their equilibrium levels before steady current can be produced at the output node of the charge pump circuit 100. The charge pump circuit's performance is therefore negatively impacted by the amount of time and energy that it takes to transition the charge pump circuit from a low power state to a high power state.

The charge pump circuit 100 in FIG. 1 also includes switching devices 117, 127, 137, 147, 157, and 167 that are used to discharge the boot node capacitors 113, 123, 133, 143, 153, and 163, respectively and thus reduce the voltage levels at the respective internal nodes in the pump stages to ground level when the charge pump circuit is placed in a low power state (e.g., power down, standby, etc.). In one embodiment, these switching devices are N type field effect transistors even though S type field effect transistors can also be used. The drain terminals of transistors 117, 127, 137, 147, 157, and 167 are coupled to the gate terminals of the switching transistors 111, 121, 131, 141, and 151, respectively. The source terminals of the transistors 117, 127, 137, 147, 157, and 167 are coupled to ground level. The gate terminals of the transistors 117, 127, 137, 147, 157, and 167 are coupled to the control signal CNTL1. In one embodiment, the control signal CNTL1 is set to a high level when the charge pump circuit is placed in a first power state (e.g., power down, standby, etc.) and set to a low level when the charge pump circuit is placed in a second power state (e.g., power on, running, active, etc.). In this embodiment, when the charge pump circuit is placed in the first power state, the control signal CNTL1 is set to high (e.g., 4.5 volts) which causes the transistors 117, 127, 137, 147, 157, and 167 to turn on. As the transistors 117, 127, 137, 147, 157, and 167 are turned on, the corresponding boot node capacitors 113, 123, 133, 143, 153, and 163 are discharged through these transistors thus reducing the corresponding voltage levels at the respective nodes to ground level. When the charge pump circuit is placed in a high power state (e.g., active, running, etc.), the control signal CNTL1 is set to a low level (e.g., ground) which causes the transistors 117, 127, 137, 147, 157, and 167 to turn off thus disconnecting the corresponding boot nodes from the ground level to allow normal operations of the charge pump circuit. Therefore, when the charge pump circuit 100 transitions from a low power state (e.g., power down) to a high power state (e.g., active), the boot node capacitors need to be pre-charged from ground level up to their equilibrium levels before steady current can be produced at the output node of the charge pump circuit 100. The charge pump circuit's performance is therefore negatively affected by the amount of time and energy that it takes to transition the charge pump circuit from a low power state to a high power state.

Figure 2:
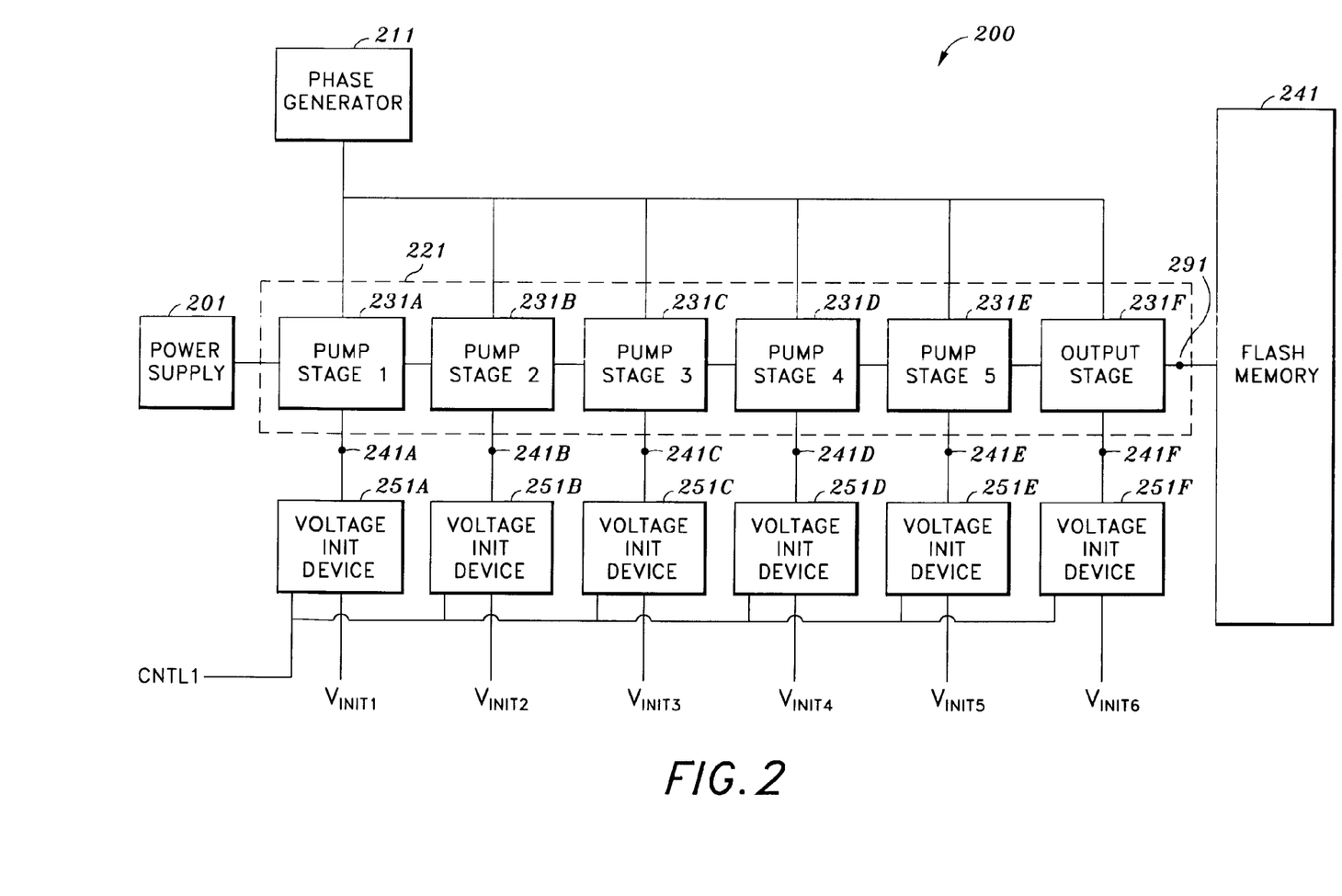
FIG. 2 shows a block diagram of one embodiment of charge pump circuit with voltage initialization mechanism.

FIG. 2 shows a block diagram of one embodiment of a system according to the teachings of the present invention. The system configuration 200 includes a power supply 201, a phase generator 211, and a positive charge pump circuit 221 including five pump stages 231 A–E and a final stage 231F, a flash memory device 241, and voltage initialization devices 251 A–F. Even though the charge pump circuit 221 in this embodiment is a positive charge pump having five pump stages, it should be understood and appreciated by one skilled in the art that the teachings of the present invention are applicable to other positive charge pump circuits having a different number of pump stages and also to negative charge pump circuits. Referring to FIG. 2, the power supply 201 is coupled to the charge pump circuit 221 to provide the input voltage and current to the charge pump circuit 221. The charge pump circuit 221, in this embodiment, includes five charge pump stages connected in series. The output node of each pump stage is connected to the input node of the next pump stage to increase the low input voltage level from the power supply to a higher voltage level that is required for certain operations of another device or circuit (e.g., a flash memory device 241). In this embodiment, the input node of the first pump stage 231A is connected to receive the input voltage and current from the power supply 201. In this embodiment, the output of the last stage 231F is connected to the flash memory device 241 to provide the required voltage and current level to the flash memory device 241. As explained above, the flash memory device 241 requires a higher voltage level than that of the power supply 201 to perform certain operations such as read operations. The phase generator 211 is coupled to the charge pump circuit 221 to provide various clock signals that are described in more detail below. The input voltage from the power supply 201 is increased serially through each pump stage of the charge pump circuit 221 in order to generate the higher required voltage level at the output node of the charge pump circuit 221. The system configuration 200 also includes voltage initialization devices 251 A–F that are coupled between corresponding initialization voltage sources Vinit1–Vinit6 and corresponding pump stages 231 A–F, respectively. In one embodiment, the voltage initialization devices 251A–F, based upon a control signal CNTL1, function as switching devices to connect the pump stages 231A–F to the corresponding initialization voltage sources when the charge pump circuit 221 is placed in a low power state (e.g., power down, standby, etc.) and disconnect the stages 231A–F from the initialization voltage sources when the charge pump circuit 221 is placed in a high power state (e.g., running, active, etc.). In one embodiment, the control signal CNTL1 is set to a first value (e.g., high level) when the charge pump circuit 221 is placed in the low power state and set to a second value (e.g., low level) when the charge pump circuit is placed in the high power state. In this embodiment, when the charge pump circuit 221 is placed in the low power state, the control signal CNTL1 is set to high which causes the voltage initialization devices 251 A–F to turn on, thus connecting the pump stages 231 A–F to the corresponding voltage sources Vinit1–Vinit6, respectively.

In one embodiment, each of voltage initialization devices 251A–F may require a certain threshold voltage level to turn on which causes a voltage drop across the respective device. As a result, the voltage levels at nodes 241A–F will be as follows:

$$V(N)=Vinit(N)-Vt(N)$$

Where V(N) is the voltage level at the respective node being connected to the corresponding voltage initialization device N, Vinit(N) is the corresponding initialization voltage, and Vt(N) is the threshold voltage of the respective voltage initialization device N.

When the charge pump circuit is placed in the high power state, the control signal CNTL1 is set to low which causes the voltage initialization devices 251A–F to turn off, thus disconnecting or isolating the corresponding charge pump stages 231A–F from their corresponding initialization voltage sources Vinit1–Vinit6, respectively.

The various initialization voltages Vinit1–Vinit6 can come from one or more voltage sources. In one embodiment, the various voltages sources Vinit1–Vinit6 are set to the same voltage level as that of the output voltage 291. In one embodiment, the output voltage 291 is coupled to the voltage initialization devices 251A–F to provide the corresponding initialization voltages Vinit1–Vinit6.

From the above description, it can be seen that an appropriate voltage level sufficiently close to the equilibrium voltage level at each pump stage can be maintained while the charge pump circuit is placed in a low power state (e.g., power down, standby, etc.) through the use of the voltage initialization devices 251A–F. As a result, when the charge pump circuit 221 is transitioned from a low power state to a high power state, the charge pump circuit 221 does not need to pre-charge itself all the way from the ground level to the equilibrium level which negatively impacts the performance of the charge pump circuit 221, as explained above with respect to the configuration in FIG. 1. Instead, the charge pump circuit 221 in FIG. 2 needs only to pre-charge from a level that is close to its equilibrium level because its internal nodes are not grounded when the charge pump circuit 221 is placed in the low power state.

Figure 3:
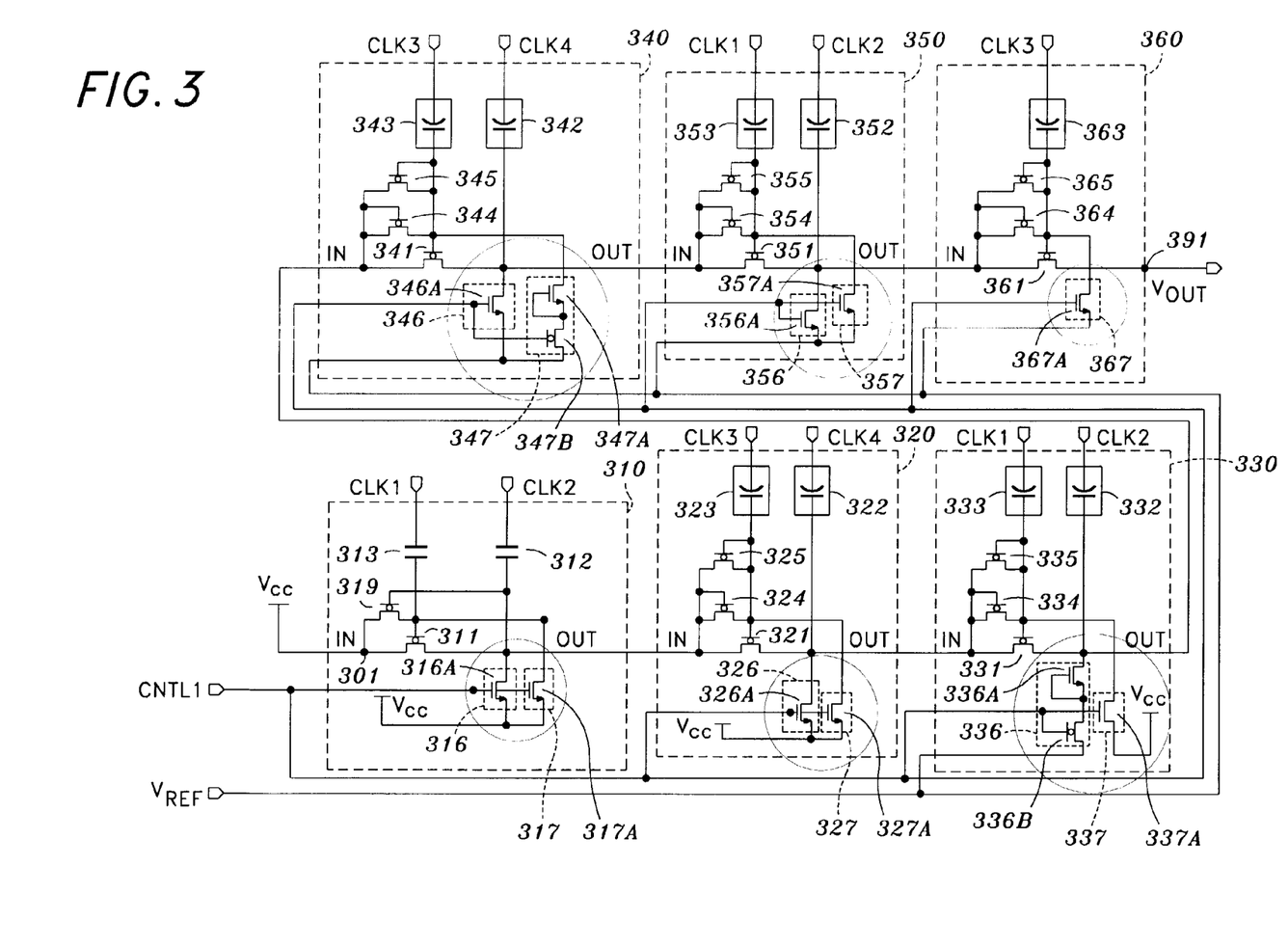
FIG. 3 is a circuit diagram of one embodiment of a charge pump circuit with voltage initialization mechanism.

FIG. 3 shows a circuit diagram of one embodiment of the charge pump circuit 221 and the voltage initialization devices 251A–F described in FIG. 2 above. In this embodiment, a voltage level sufficiently close to the respective equilibrium voltage level at each pump stage is maintained while the charge pump circuit 221 is placed in a low power state (e.g., shut down, power off, standby, etc.) to reduce the time and energy that it takes to transition the charge pump circuit from the low power state to a high power state.

In one embodiment, the charge pump circuit 300 as shown in FIG. 3 includes five pump stages 310, 320, 330, 340, 350, and an output stage 360 that are connected in series in order to increase a low voltage level received at an input node 301 to a higher voltage level at an output node 391. Each pump stage in the charge pump circuit 300 includes an input node (CHGIN) and an output node (CHGOUT). The output node of each pump stage is coupled to the input node of a next pump stage. In one embodiment, the input node of the first pump stage 310 is coupled to receive an input voltage from a power supply source (not shown). In one embodiment, the output node of the final stage 360 is coupled to provide the output voltage to a device or circuit that requires a higher voltage level than that provided by the power supply (e.g., a flash memory device).

In this embodiment, the charge pump circuit 300 includes switching transistors 311, 321, 331, 341, 351, and 361 that are connected in series between the input node 301 and the output node 391. In one embodiment, the switching transistors are S type field effect transistors even though N type field effect transistors can also be used. Each of the switching transistors 311, 321, 331, 341, 351, and 361 includes a source terminal, a drain terminal, and a gate terminal. The source terminal of each switching transistor is connected to the drain terminal of the next switching transistor. The drain terminal of the first switching transistor 311 is connected to the input node 301 and the source terminal of the last switching transistor 361 is connected to the output node 391.

The charge pump circuit 300 further includes storage capacitors 312, 322, 332, 342, and 352. Each of the storage capacitors is coupled between a corresponding clock signal and the source terminal of the respective switching transistor in the charge pump circuit 300. Specifically, the storage capacitor 312 is connected between a clock signal CLK2 and the source terminal of the switching transistor 311. The storage capacitor 322 is connected between a clock signal CLK4 and the source terminal of the switching transistor 321. The storage capacitor 332 is connected between the clock signal CLK2 and the source terminal of the switching transistor 331. The storage capacitor 342 is connected between the clock signal CLK4 and the source terminal of the switching transistor 341. The storage capacitor 352 is connected between the clock signal CLK2 and the source terminal of the switching transistor 351.

The charge pump circuit 300 as shown in FIG. 3 also includes boot node capacitors 313, 323, 333, 343, 353, and 363. Each of the boot node capacitors is coupled between a corresponding clock signal and the gate terminal of the respective switching transistor in the charge pump circuit 300. Specifically, the boot node capacitor 313 is connected between a clock signal CLK1 and the gate terminal of the switching transistor 311. The boot node capacitor 323 is connected between a clock signal CLK3 and the gate terminal of the switching transistor 321. The boot node capacitor 333 is connected between the clock signal CLK1 and the gate terminal of the switching transistor 331. The boot node capacitor 343 is connected between the clock signal CLK3 and the gate terminal of the switching transistor 341. The boot node capacitor 353 is connected between the clock signal CLK1 and the gate terminal of the switching transistor 351. The boot node capacitor 363 is connected between the clock signal CLK3 and the gate of the switching transistor 361.

The charge pump circuit 300 further includes a control transistor 319 in the first pump stage 310. The drain and source terminals of the control transistor 319 are coupled to the drain and gate terminals, respectively, of the switching transistor 311. In this embodiment, the control transistor 319 is an S type field effect transistor even though N type field effect transistor can also be used. The charge pump circuit 300 also includes pull-up transistors 324, 334, 344, 354, and 364 that are preferably S type field effect transistors although N type field effect transistors can also be used. The source terminals of pull-up transistors 324, 334, 344, 354, and 364 are coupled to the gate terminals of the switching transistors 321, 331, 341, 351, and 361, respectively. The pull-up transistors 324, 334, 344, 354, and 364 are diode connected in which their respective drain and gate terminals are connected to the drain terminals of the switching transistors 321, 331, 341, 351, and 361, respectively.

Also included in the charge pump circuit 300 are the pull-down transistors 325, 335, 345, 355, and 365 that are also diode connected. In this embodiment, the pull-down transistors are S type field effect transistors even though N type field effect transistors can also be used. The drain and gate terminals of the pull-down transistors 325, 335, 345, 355, and 365 are connected to the gate terminals of the switching transistors 321, 331, 341, 351, and 361, respectively. The source terminals of the pull-down transistors 325, 335, 345, 355, and 365 are connected to the drain terminals of the switching transistors 321, 331, 341, 351, and 361, respectively.

In another embodiment, the control transistor 319 in the first pump stage 310 can be replaced by a pair of pull-up and pull-down transistors used in the subsequent pump stages as described above.

The charge pump circuit as shown in FIG. 3 includes voltage initialization devices 316, 326, 336, 346, and 356 that are used to keep the voltage levels at the corresponding output nodes sufficiently close to their equilibrium voltage levels when the charge pump circuit 300 is placed in a low power state (e.g., power down, standby, etc.). In one embodiment, each of the voltage initialization devices may include one or more transistors having certain threshold voltages, depending on the appropriate voltage level that needs to be maintained at the respective node of each pump stage. In one embodiment, the one or more transistors used in each voltage initialization device can be N type field effect transistors, S type field effective transistors, or both depending on how much threshold voltage is desired for a particular implementation. S type field effect transistors have lower threshold voltage than N type field effect transistors. For purposes of explanations and illustrations in this example, certain number of N type field effect and/or S type field effect transistors are used for each voltage initialization device in each pump stage to maintain a specific voltage level that is close to the equilibrium voltage level of each pump stage when the charge pump circuit is placed in a low power state. However, it should be understood and appreciated by one skilled in the art that other combinations of transistors or control devices having different threshold voltage levels can also be used to maintain a desired voltage level at each pump stage based on various factors including, but are not limited to, system performance requirements such as response time, output voltage and/or current levels, etc. and system constraints such as circuit die area, equilibrium voltage level, power consumption, heat dissipation, etc.

In one embodiment, the voltage initialization device 316 includes an N type field effect transistor 316A. The drain terminal of the transistor 316A is coupled to the output node of the pump stage 310. The source terminal of the transistor 316A is coupled to a corresponding initialization voltage source, in this example Vcc. The gate terminal of the transistor 316A is coupled to a control signal CNTL1. The voltage initialization device 326 includes an N type field effect transistor 326A. The drain terminal of the transistor 326A is coupled to the output node of the pump stage 320. The source terminal of the transistor 326A is coupled to a corresponding initialization voltage source, Vcc in this example. The gate terminal of the transistor 326A is coupled to the control signal CNTL1. The voltage initialization device 336 includes an N type field effect transistor 336A and an S type field effect transistor 336B that are connected in series. The drain terminal of the transistor 336A is coupled to the output node of the pump stage 330 while the gate and the source terminals of the transistor 336A are coupled to the drain terminal of the transistor 336B. The source terminal of the transistor 336B is coupled to a corresponding initialization voltage source VREF. In one embodiment, the voltage source VREF is set to the same voltage level as that of the output node 391. The gate terminal of the transistor 336B is coupled to the control signal CNTL1. The voltage initialization device 346 in this embodiment includes an N type field effect transistor 346A. The drain terminal of the transistor 346A is coupled to the output node of the pump stage 340. The source terminal of the transistor 346A is coupled to the voltage source VREF and the gate terminal of the transistor 346A is coupled to the control signal CNTL1. The voltage initialization device 356 includes an S type field effect transistor 356A. The drain terminal of the transistor 356A is coupled to the output node of the pump stage 350. The source terminal of the transistor 356A is coupled to the voltage source VREF and the gate terminal of the transistor 356A is coupled to the control signal CNTL1.

The charge pump circuit as shown in FIG. 3 also includes voltage initialization devices 317, 327, 337, 347, 357, and 367 that are used to keep the voltage levels at the corresponding boot nodes sufficiently close to their equilibrium voltage levels when the charge pump circuit 300 is placed in a low power state (e.g., power down, standby, etc.). In one embodiment, each of the voltage initialization devices may include one or more transistors having certain threshold voltages, depending on the appropriate voltage level that needs to be maintained at the respective node of each pump stage. In one embodiment, the one or more transistors used in each voltage initialization device can be N type field effect transistors, S type field effective transistors, or both depending on how much threshold voltage is desired for a particular implementation. S type field effect transistors have lower threshold voltage than N type field effect transistors. For purposes of explanations and illustrations in this example, certain number of N type field effect and/or S type field effect transistors are used for each voltage initialization device in each pump stage to maintain a specific voltage level that is close to the equilibrium voltage level of each boot node when the charge pump circuit is placed in a low power state. However, it should be understood and appreciated by one skilled in the art that other combinations of transistors or control devices having different threshold voltage levels can also be used to maintain a desired voltage level at each boot node based on various factors including, but arc not limited to, system performance requirements such as response time, output voltage and/or current levels, etc. and system constraints such as circuit die area, equilibrium voltage level, power consumption, heat dissipation, etc.

In this embodiment, the voltage initialization device 317 includes an N type field effect transistor 317A. The drain terminal of the transistor 317A is coupled to the boot node of the pump stage 310. The source terminal of the transistor 317A is coupled to a voltage source, in this example Vcc. The gate terminal of the transistor 317A is coupled to the control signal CNTL1. The voltage initialization device 327 includes an N type field effect transistor 327A. The drain terminal of the transistor 327A is coupled to the boot node of the pump stage 320. The source terminal of the transistor 327A is coupled to a voltage source, Vcc in this example. The gate terminal of the transistor 327A is coupled to the control signal CNTL1. The voltage initialization device 337 includes an N type field effect transistor 337A. The drain terminal of the transistor 337A is coupled to the boot node of the pump stage 330. The source of the transistor 337A is coupled to the voltage source Vcc and the gate of the transistor 337A is coupled to the control signal CNTL1.

The voltage initialization device 347 includes an N type field effect transistor 347A and an S type field effect transistor 347B that are connected in series. The drain terminal of the transistor 347A is coupled to the boot node of the pump stage 340 while the gate and the source terminals of the transistor 347A are coupled to the drain terminal of the transistor 347B. The source terminal of the transistor 347B is coupled to the voltage source VREF. The gate terminal of the transistor 347B is coupled to the control signal CNTL1. The voltage initialization device 357 in this embodiment includes an N type field effect transistor 357A. The drain terminal of the transistor 357A is coupled to the boot node of the pump stage 350. The source terminal of the transistor 357A is coupled to the voltage source VREF and the gate terminal of the transistor 357A is coupled to the control signal CNTL1. The voltage initialization device 367 includes an N type field effect transistor 367A. The drain terminal of the transistor 367A is coupled to the boot node of the pump stage 360. The source terminal of the transistor 367A is coupled to the voltage source VREF and the gate terminal of the transistor 367A is coupled to the control signal CNTL1.

In one embodiment, the control signal CNTL1 is set to a high level when the charge pump circuit is placed in a first power state (e.g., power down, standby, etc.) and set to a low level when the charge pump circuit is placed in a second power state (e.g., power on, running, active, etc.). In this embodiment, when the charge pump circuit is placed in the first power state, the control signal CNTL1 is set to high (e.g., 4.5 volts) which causes the transistors 316A, 326A, 336A, 346A, and 356A to turn on. As the transistor 336B is turned on, the transistor 336A is also turned on. As the transistors 316A and 326A are turned on, the output nodes of the corresponding pump stages 310 and 320, respectively, are connected to the voltage source Vcc. The voltage levels at these two output nodes are therefore equal to the voltage source Vcc less any voltage drop due to the threshold voltage of the corresponding transistors 316A and 326A, respectively.

As the transistors 336A, 336B, 346A, and 356A are turned on, the output nodes of the corresponding pump stages 330, 340, and 350, respectively, are connected to the voltage source VREF. The voltage levels at these output nodes are therefore equal to the voltage source VREF less any voltage drop due to the threshold voltage of the transistors 336A, 336B, 346A, and 356A, respectively.

Similarly, in this embodiment, when the charge pump circuit is placed in the first power state, the control signal CNTL1 is set to high (e.g., 4.5 volts) which causes the transistors 317A, 327A, 337A, 347A, 347B, 357A, and 367A to turn on. As the transistor 347B is turned on, the transistor 347A is also turned on. As the transistors 317A and 327A are turned on, the output nodes of the corresponding pump stages 310 and 320, respectively, are connected to the voltage source Vcc. The voltage levels at these two output nodes are therefore equal to the voltage source Vcc less any voltage drop due to the threshold voltage of the transistors 317A and 327A, respectively.

As the transistors 337A, 347A, 347B, 357A, and 367A are turned on, the boot nodes of the corresponding pump stages 330, 340, 350, and 360, respectively, are connected to the voltage source VREF. The voltage levels at these boot nodes are therefore equal to the voltage source VREF less any voltage drop due to the threshold voltage of the transistors 337A, 347A, 347B, 357A and 367A, respectively.

The control signal CNTL1 is set to low when the charge pump circuit is placed in a high power state (e.g., active, running, etc.). When the control signal CNTL1 is set to low, all the voltage initialization devices are turned off thus disconnecting or isolating the output nodes and the boot nodes of the pump stages from the Vcc and VREF sources, allowing the charge pump circuit 300 to function normally.

By maintaining a voltage level at each boot node and output node that is sufficiently close to the equilibrium voltage level at each pump stage using the voltage initialization devices as described above, the charge pump circuit 300 takes substantially less time and energy to pre-charge up to the equilibrium level because it does not need to pre-charge all the way from the ground level as the charge pump circuit 100 does.

Figure 4:
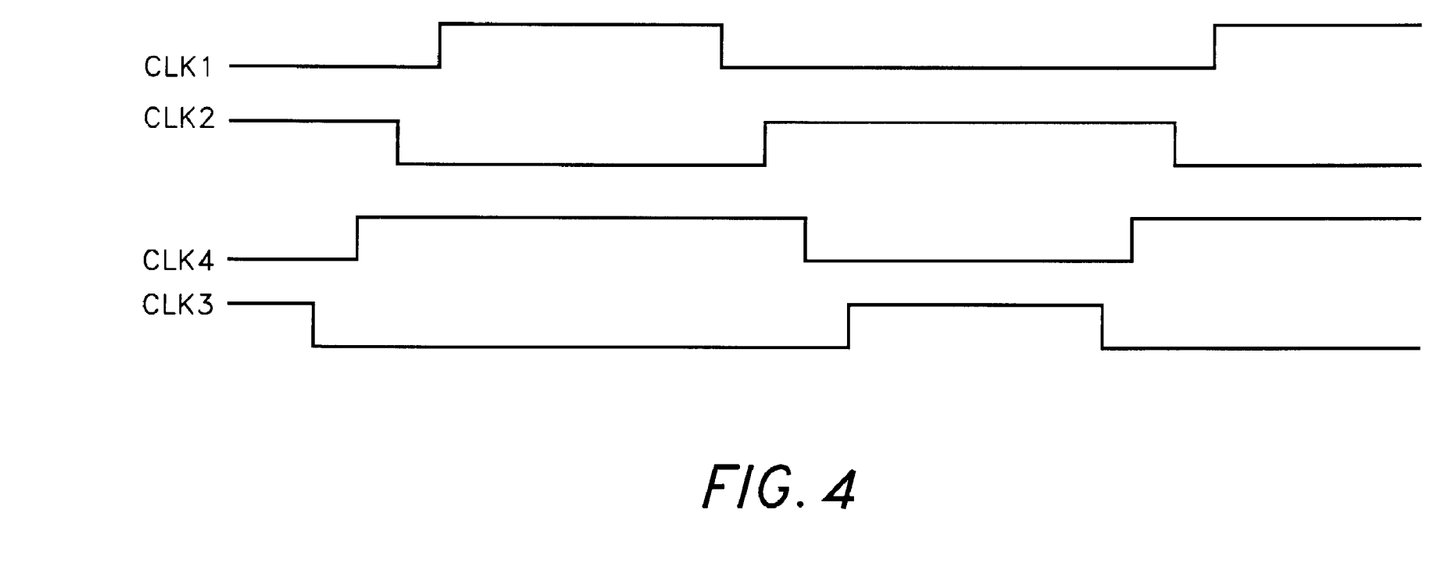
FIG. 4 shows a timing diagram of one embodiment of various clock signals that are used in connection with the charge pump circuit in FIG. 3.

FIG. 4 shows an example of a timing diagram of the clock signals CLK1, CLK2, CLK3, and CLK4 that are used in connection with the charge pump circuit 300 described in FIG. 3. In one embodiment, the clock signals CLK1, CLK2, CLK3, and CLK4 are at Vcc during high phase and ground during low phase. The present discussion is focused on the normal operations of the charge pump stages 310 and 320 when the charge pump circuit 300 is placed in a high power state (e.g., active, running, etc.). When the clock signal CLK1 is high and the clock signal CLK2 is low, the switching transistor 311 is turned on allowing charge to be transferred from the input source Vcc to the storage capacitor 312. When the CLK1 goes low, the switching transistor 311 is turned off. When the CLK2 goes high, the storage capacitor 312 continues to be charged. As the clock signal CLK3 goes high, the switching transistor 321 is turned on and charge is transferred from the storage capacitor 312 to the storage capacitor 322. The diode connected pull-down transistor 325 is used to prevent back flow from the output node of pump stage 320 to the output node of pump stage 310 when the voltage level of the output node 3200 exceeds the voltage level at the output node 3100. When this happens, the pull-down transistor 325 causes the switching transistor 321 to turn off to prevent the back flow.

Figure 5:
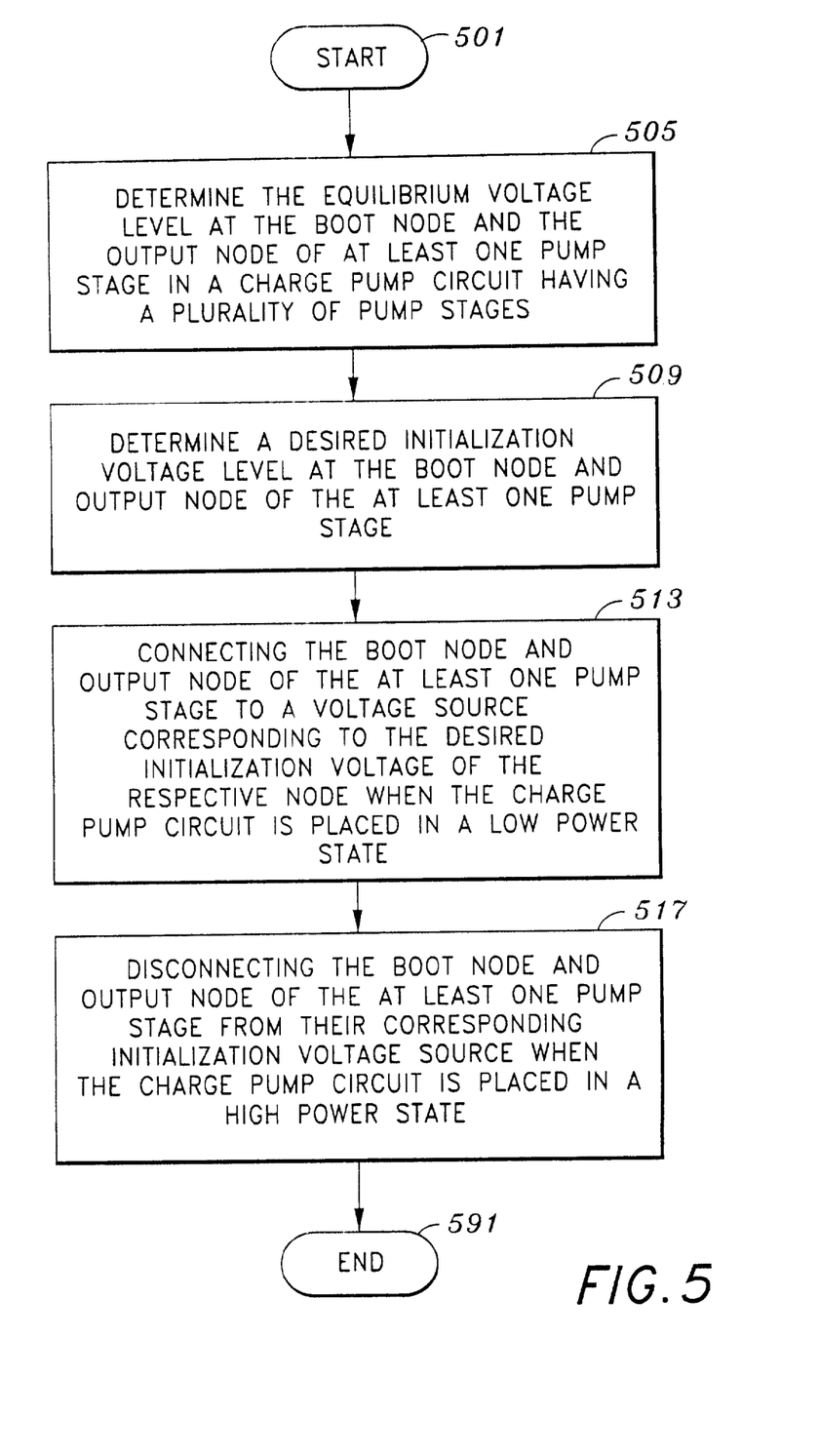
FIG. 5 illustrates a flow diagram of one embodiment of a method for rapid initialization of a charge pump circuit.

FIG. 5 illustrates a flow diagram of one embodiment of a method 500 for reducing the time and energy that it takes for a charge pump circuit to transition from a low power state (e.g., power down, standby, etc.) to a high power state (e.g., active, running, etc.). The charge pump circuit in this example includes a plurality of pump stages that are connected in series to increase an input voltage, for example from a power supply, to a higher output voltage that is required for the operations of certain devices, for example flash memory devices. Each pump stage in the charge pump circuit in this example contains an output node and a boot node both of which need to reach a corresponding equilibrium voltage level before steady current can be generated at the required output voltage. The method starts at block 501 and proceeds to block 505. At block 505, the corresponding equilibrium voltage levels at the boot node and output node in each pump stage are determined. At block 509, a corresponding desired initialization voltage level that is to be maintained at each boot node and each output node is determined. The desired initialization voltage level at each node is a voltage level that is sufficiently close to the equilibrium voltage level of the respective node and can be chosen differently depending upon the requirements and constraints of particular implementations and/or applications. For example, in one embodiment, the desired initialization voltage at a particular node can be set to be equal to the equilibrium voltage level of that particular node less the threshold voltage of a particular voltage initialization device (e.g., a transistor) that is used to control the voltage level of that particular node when the charge pump circuit is placed in a low power state. At block 513, the boot node and output node of each pump stage are connected to a voltage source corresponding to their respective desired initialization voltage when the charge pump circuit is placed in a low power state (e.g., power down, standby, etc.). At node 517, the boot node and output node of each pump stage are disconnected or isolated from their corresponding initialization voltage source to allow normal operations of the charge pump circuit. As described above, in one embodiment, voltage initialization devices containing one or more transistors are used to connect the nodes to and disconnect the nodes from their corresponding initialization voltage sources, based upon a control signal indicating whether the charge pump circuit is in the low or high power state. The method 500 proceeds to end at block 591.

Figure 6:
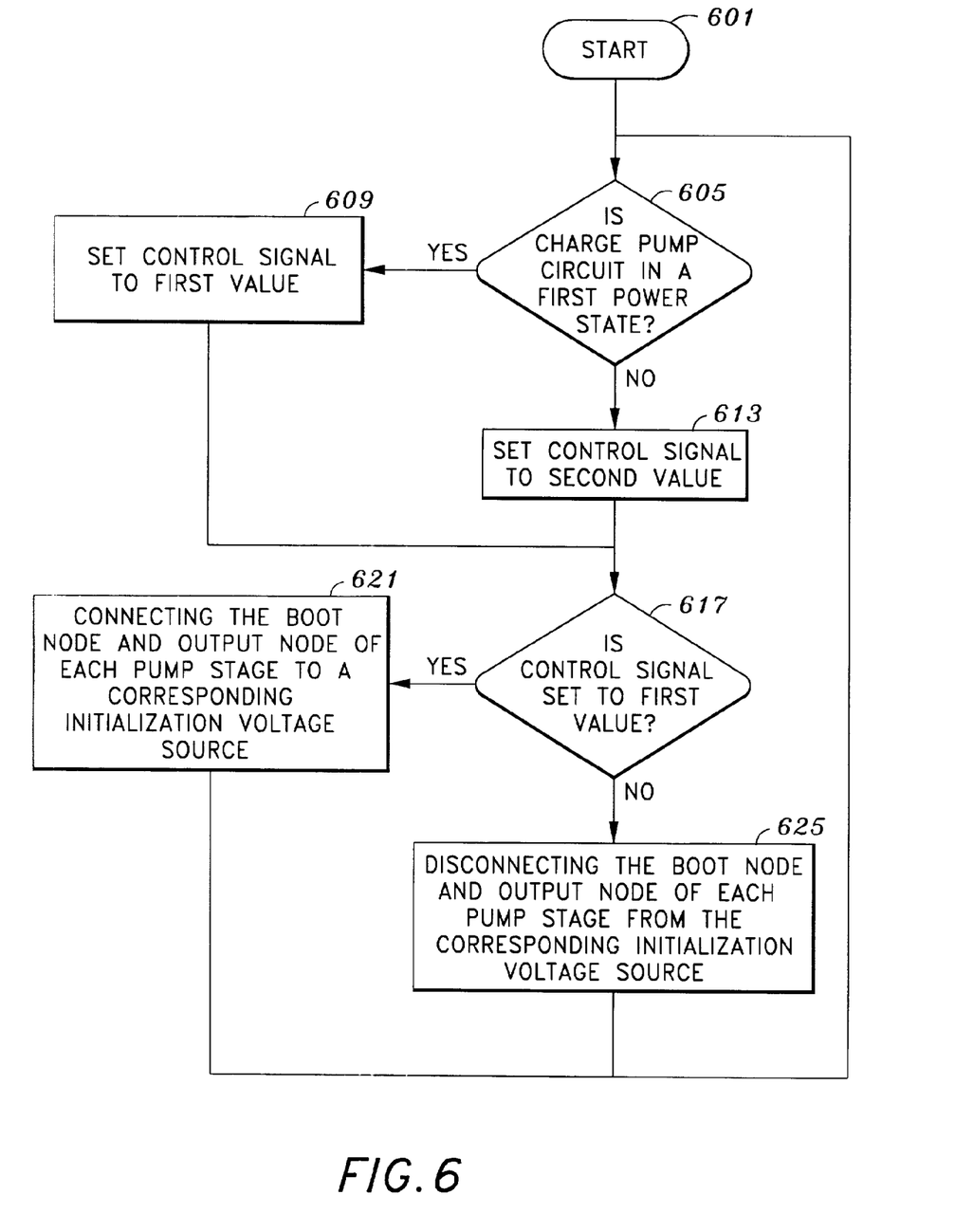
FIG. 6 shows a flow diagram of one embodiment of a method for rapid transition of a charge pump circuit from a low power state to a high power state.

FIG. 6 is a flow diagram of one embodiment of a method 600 for rapid initialization or warm-up of a charge pump circuit as described above. The method starts at block 601. At decision block 605, it is determined whether the charge pump circuit is placed in a first power state (e.g., low power state). The method 600 proceeds to block 609 if the charge pump circuit is placed in the first power state, otherwise the method 600 proceeds to block 613. At block 609, a control signal is set to a first value (e.g., a positive voltage). At block 613, the control signal is set to a second value (e.g., ground). At decision block 617, the method 600 proceeds to block 621 if the control signal is set to the first value, otherwise it proceeds to block 625. At block 621, the boot node and output node of each pump stage are set to their corresponding initialization voltage levels by connecting the respective boot node and output node to their corresponding initialization voltage sources. At block 625, the boot node and output node of each pump stage are disconnected or isolated from their corresponding initialization voltage sources. The method 600 then loops back from blocks 621 and 625 to decision block 605.

The invention has been described in conjunction with the preferred embodiment. It is evident that numerous alternatives, modifications, variations and uses will be apparent to those skilled in the art in light of the foregoing description.

What is claimed is:

1. A method for rapid initialization of a charge pump circuit having at least one pump stage the at least one pump stage including an input node and an output node, the method comprising:

coupling a first terminal of a first transistor to the input node and a second terminal of the first transistor to the output node;

coupling a first end of a first capacitor to a first clock signal and a second end of the first capacitor to a gate of the first transistor forming a boot node;

coupling a first end of a second capacitor to a second clock signal and a second end of the second capacitor to the second terminal of the first transistor;

coupling an input terminal of a first diode to the gate of the first transistor and an output terminal of the first diode to the first terminal of the first transistor;

coupling an input terminal of a second diode to the first terminal of the first transistor and an output terminal of the second diode to the gate of the first transistor;

coupling a first voltage initialization device between the gate of the first transistor and first reference voltage; and coupling a second voltage initialization device between the second terminal of the first transistor and a second reference voltage.

2. The method of claim 1 further comprising:

connecting the boot node to the first reference voltage in response to a control signal indicating that the charge pump circuit is in a first power state.

3. The method of claim 2 further comprising:

connecting the output node to the second reference voltage in response to the control signal indicating that the charge pump circuit is in the first power state.

4. The method of claim 3 further comprising:

disconnecting the boot node from the first reference voltage in response to the control signal indicating that the charge pump circuit is in a second power state.

5. The method of claim 4 further comprising:

disconnecting the output node from the second reference voltage in response to the control signal indicating that the charge pump circuit is in the second power state.

6. The method of claim 5 wherein connecting the boot node to the first reference voltage comprises:

turning on the first voltage initialization device in response to the control signal indicating that the charge pump circuit is in the first power state.

7. The method of claim 6 wherein connecting the output node to the second reference voltage comprises:

turning on the second voltage initialization device in response to the control signal indicating that the charge pump circuit is in the first power state.

8. The method of claim 7 wherein disconnecting the boot node from the first reference voltage comprises:

turning off the first voltage initialization device in response to the control signal indicating that the charge pump circuit is in the second power state.

9. The method of claim 8 wherein disconnecting the output node from the second reference voltage comprises:

turning off the second voltage initialization device in response to the control signal indicating that the charge pump circuit is in the second power state.

10. The method of claim 8 wherein the first voltage initialization device comprises at least one transistor, the at least one transistor being turned on in response to the control signal indicating that the charge pump circuit is in the first power state and being turned off in response to the control signal indicating that the charge pump circuit is in the second power state.

11. The method of claim 9 wherein the second voltage initialization device comprises at least one transistor, the at least one transistor being turned on in response to the control signal indicating that the charge pump circuit is in the first power state and being turned off in response to the control signal indicating that the charge pump circuit is in the second power state.

12. A charge pump stage in a charge pump circuit that allows for rapid initialization when the charge pump circuit transitions from a lower power state to a high power state, the charge pump stage including an input node and an output node and comprising:

a first transistor including a gate, a first terminal, and a second terminal, the first terminal being coupled to the input node and the second terminal being coupled to the output node;

a first capacitor having a first end and a second end, the first end being coupled to a first clock signal and the second end being coupled to the gate of the first transistor;

a second capacitor having a first end and a second end, the first end being coupled to a second clock signal and the second end being coupled to the second terminal of the first transistor;

a first diode having an input terminal and an output terminal, the input terminal being coupled to the gate of the first transistor and the output terminal being coupled to the first terminal of the first transistor;

a second diode having an input terminal and an output terminal, the input terminal being coupled to the first terminal of the first transistor and the output terminal being coupled to the gate of the first transistor;

a first voltage initialization device coupled between the gate of the first transistor and a first reference voltage; and a second voltage initialization device coupled between the second terminal of the first transistor and a second reference voltage.

13. The charge pump stage of claim 12 wherein the first and second initialization voltage devices are turned on to connect the gate of the first transistor to the first reference voltage and the second terminal of the first transistor to the second reference voltage, respectively, in response to a control signal indicating that the charge pump circuit is in the low power state.

14. The charge pump stage of claim 13 wherein the first and second initialization voltage devices are turned off to disconnect the gate of the first transistor from the first reference voltage and the second terminal of the first transistor from the second reference voltage, respectively, in response to the control signal indicating that the charge pump circuit is in the high power state.

15. The charge pump stage of claim 14 wherein the first voltage initialization voltage comprises at least one transistor having a corresponding threshold voltage.

16. The charge pump stage of claim 15 wherein the second voltage initialization voltage comprises at least one transistor having a corresponding threshold voltage.

17. A charge pump circuit having a plurality of pump stages, each pump stage having an input node and an output node and comprising:

a first transistor including a gate, a first terminal, and a second terminal, the first terminal being coupled to the input node of the respective pump stage and the second terminal being coupled to the output node of the respective pump stage;

a first capacitor having a first end and a second end, the first end being coupled to a first clock signal and the second end being coupled to the gate of the first transistor forming a boot node, the boot node being connected to a first corresponding voltage source when the charge pump circuit is in a first power state and being disconnected from the first corresponding voltage source when the charge pump circuit is in a second power state;

a second capacitor having a first end and a second end, the first end being coupled to a second clock signal and the second end being coupled to the output node of the respective pump stage, the output node being connected to a second corresponding voltage source when the charge pump circuit is in the first power state and being disconnected from the second corresponding voltage source when the charge pump circuit is in the second power state;

a first diode having an input terminal and an output terminal, the input terminal being coupled to the gate of the first transistor and the output terminal being coupled to the first terminal of the first transistor; and a second diode having an input terminal and an output terminal, the input terminal being coupled to the first terminal of the first transistor and the output terminal being coupled to the gate of the first transistor.

18. The charge pump circuit of claim 17 wherein the first transistor is an N type field effect transistor.

19. The charge pump circuit of claim 17 wherein the first transistor is an S type field effect transistor.

20. The charge pump circuit of claim 17 wherein the first diode comprises a transistor having a drain, a gate, and a source, the gate and the drain being coupled together to form the input terminal of the first diode, the source to form the output terminal of the first diode.

21. The charge pump circuit of claim 17 wherein the second diode comprises a transistor having a drain, a gate, and a source, the gate and the drain being coupled together to form the input terminal of the second diode, the source to form the output terminal of the second diode.

22. The charge pump circuit of claim 17 further comprising:

a first control device connected between the boot node and the first corresponding voltage source, the first control device being switched on to connect the boot node to the first corresponding voltage source and being switched off to disconnect the boot node from the first corresponding voltage source, based upon the value of a first control signal.

23. The charge pump circuit of claim 22 wherein the first control signal is set to a first control voltage level when the charge pump circuit is in the first power state and to a second control voltage level when the charge pump circuit is in the second power state.

24. The charge pump circuit of claim 22 wherein the first control device when switched on causes a voltage drop between the first corresponding voltage source and the boot node.

25. The charge pump circuit of claim 22 wherein the first control device comprises at least a control transistor having a gate, a first terminal, and a second terminal, the gate of the control transistor being coupled to the first control signal, the first terminal being coupled to the first corresponding voltage source and the second terminal being coupled to the boot node.

26. The charge pump circuit of claim 17 further comprising:

a second control device connected between the output node and the second corresponding voltage source, the second control device being switched on to connect the output node to the second corresponding voltage source and being switched off to disconnect the output node from the second corresponding voltage source, based upon the value of a first control signal.

27. The charge pump circuit of claim 26 wherein the first control signal is set to a first control voltage level when the charge pump circuit is in the first power state and to a second control voltage level when the charge pump circuit is in the second power state.

28. The charge pump circuit of claim 26 wherein the second control device when switched on causes a voltage drop between the second corresponding voltage source and the output node.

29. The charge pump circuit of claim 26 wherein the second control device comprises at least a control transistor having a gate, a first terminal, and a second terminal, the gate of the control transistor being coupled to the first control signal, the first terminal being coupled to the second corresponding voltage source and the second terminal being coupled to the output node.

* * * * *